(12) United States Patent
Fulleringer et al.

(10) Patent No.: US 12,110,128 B2
(45) Date of Patent: Oct. 8, 2024

(54) TRANSMISSION DEVICE FOR HYBRID AIRCRAFT

(71) Applicant: SAFRAN HELICOPTER ENGINES, Bordes (FR)

(72) Inventors: Benjamin Nicolas Fulleringer, Moissy-Cramayel (FR); Antoine Pascal Moutaux, Moissy-Cramayel (FR); Romain Jean Gilbert Thiriet, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/559,224

(22) PCT Filed: Apr. 25, 2022

(86) PCT No.: PCT/FR2022/050779
§ 371 (c)(1),
(2) Date: Nov. 6, 2023

(87) PCT Pub. No.: WO2022/234210
PCT Pub. Date: Nov. 10, 2022

(65) Prior Publication Data
US 2024/0239509 A1    Jul. 18, 2024

(30) Foreign Application Priority Data
May 6, 2021   (FR) ........................................ 2104791

(51) Int. Cl.
*B64D 35/022*    (2024.01)
*B64C 27/12*    (2006.01)
(Continued)

(52) U.S. Cl.
CPC ........... *B64D 35/022* (2024.01); *B64D 35/08* (2013.01); *F01D 15/10* (2013.01); *F02C 7/32* (2013.01);
(Continued)

(58) Field of Classification Search
CPC ....... B64D 35/022; B64D 35/08; F01D 15/10; F02C 7/32; B64C 27/12; F05D 2220/50; F05D 2220/76
See application file for complete search history.

(56) References Cited

U.S. PATENT DOCUMENTS

| 2015/0028594 A1* | 1/2015 | Mariotto | .............. H02K 7/1823 |
| | | | 310/78 |
| 2015/0143950 A1* | 5/2015 | Bedrine | .................. B64C 27/04 |
| | | | 74/661 |

(Continued)

FOREIGN PATENT DOCUMENTS

| FR | 2929324 A1 | 10/2009 |
| FR | 2993727 A1 | 1/2014 |

(Continued)

OTHER PUBLICATIONS

Search Report and Written Opinion issued in French Application 2104791, issued on Dec. 6, 2021.

(Continued)

*Primary Examiner* — Hoang M Nguyen
(74) *Attorney, Agent, or Firm* — Bookoff McAndrews, PLLC

(57) ABSTRACT

A device for a hybrid aircraft including a turboshaft engine having a gas generator, a free turbine, and a main rotor. The device includes a first reversible electric machine coupled to a shaft of the free turbine by way of a first free wheel, and to the main rotor. The device further includes a second reversible electric machine coupled to a shaft of the gas
(Continued)

generator by way of a second free wheel, and coupled to the main rotor by way of a third free wheel. The second free wheel activates when the second electric machine rotates in a first direction of rotation, and the third free wheel activates when the second electric machine rotates in a second direction of rotation opposite to the first direction of rotation.

10 Claims, 10 Drawing Sheets

(51) Int. Cl.
    *B64D 35/08*     (2006.01)
    *F01D 15/10*     (2006.01)
    *F02C 7/32*     (2006.01)
(52) U.S. Cl.
    CPC .......... *B64C 27/12* (2013.01); *F05D 2220/50* (2013.01); *F05D 2220/76* (2013.01)

(56) References Cited

U.S. PATENT DOCUMENTS

| 2019/0323427 | A1 | 10/2019 | Mackin | |
| 2021/0039802 | A1* | 2/2021 | Chesneau | F01D 15/10 |
| 2021/0237887 | A1* | 8/2021 | Besse | B64C 27/06 |
| 2022/0243663 | A1* | 8/2022 | De Wergifosse | F16H 57/082 |

FOREIGN PATENT DOCUMENTS

| FR | 3099319 | A1 | 1/2021 |
| FR | 3066444 | A1 | 4/2021 |
| WO | 2019155173 | A1 | 8/2019 |

OTHER PUBLICATIONS

Search Report and Written Opinion issued in International Application No. PCT/FR2022/050779, issued on Oct. 7, 2022.

* cited by examiner

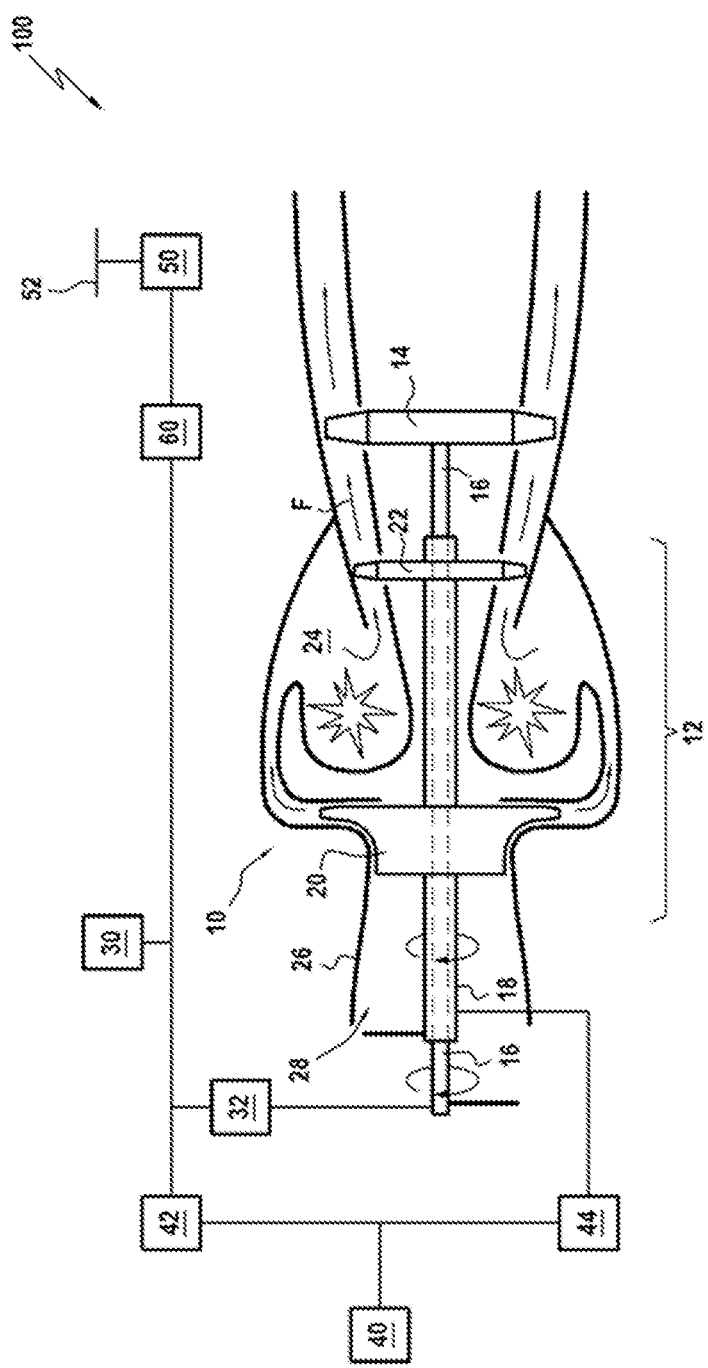

[Fig. 2]
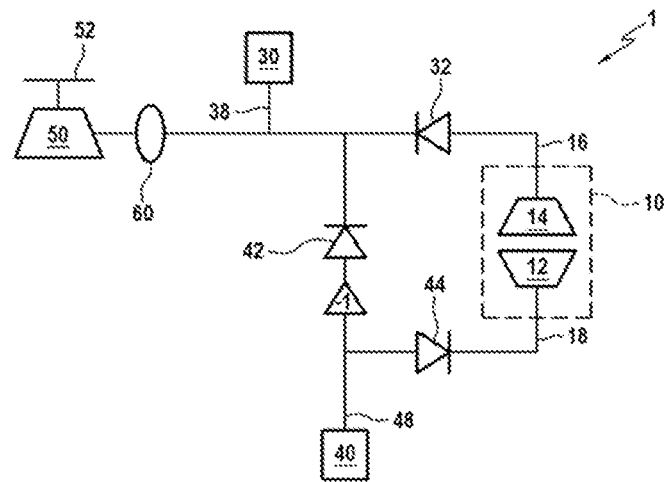
[Fig. 3A-3B]
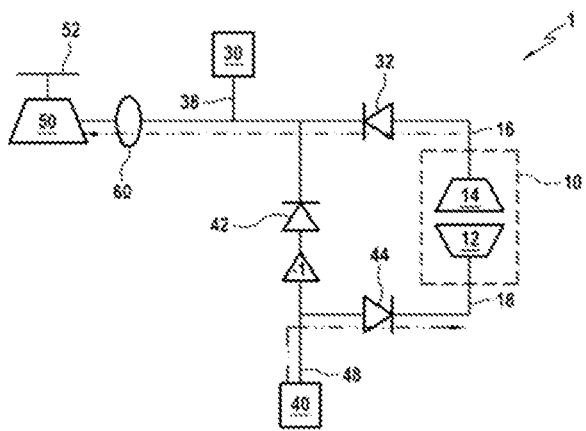
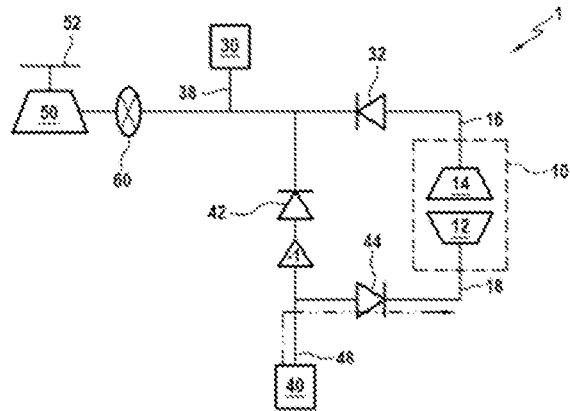

[Fig. 4]
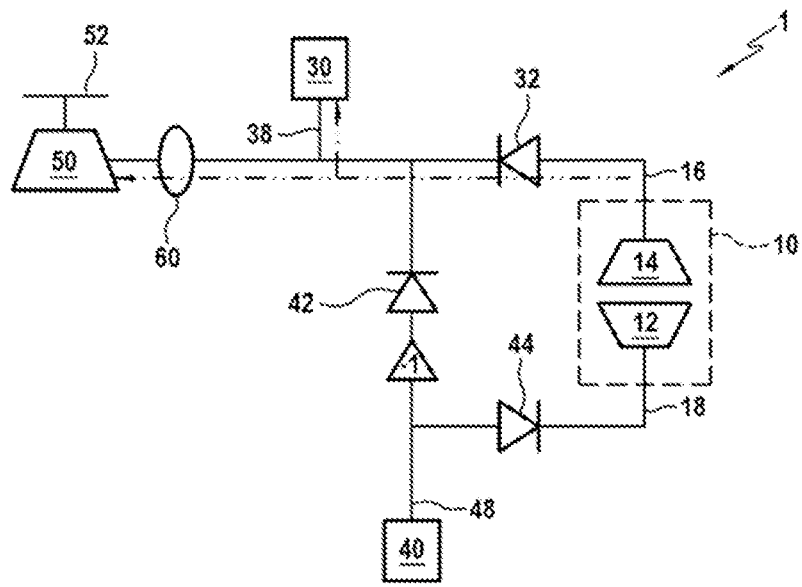
[Fig. 5]
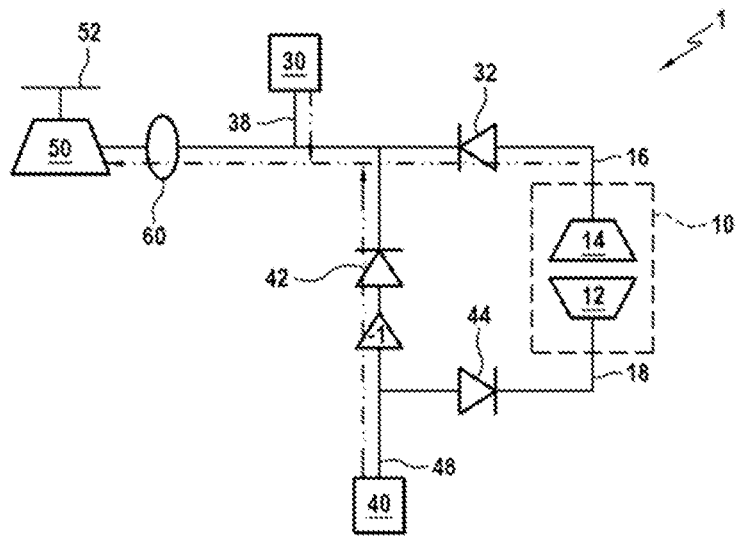

[Fig. 6]
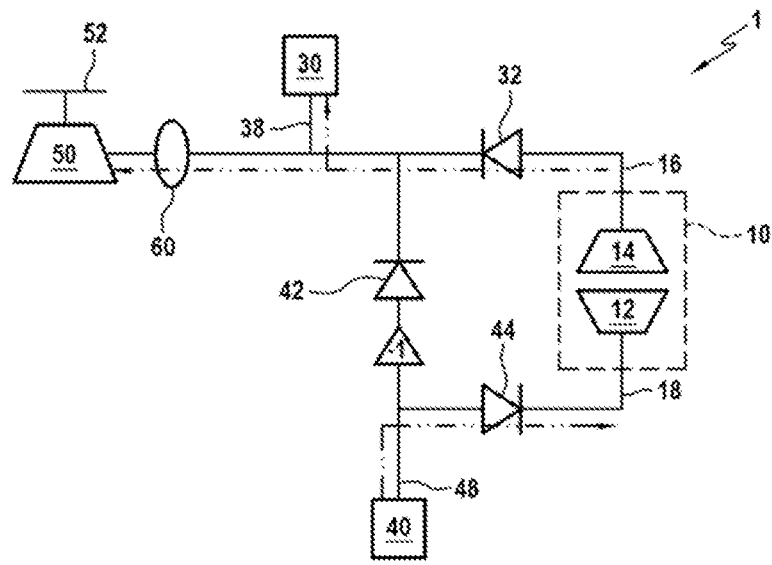
[Fig. 7]
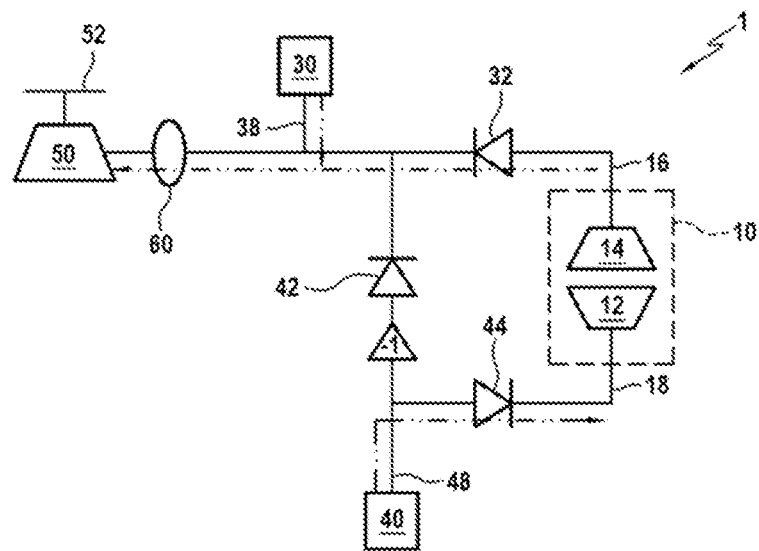

[Fig. 8A-8C]
[Fig. 8A]
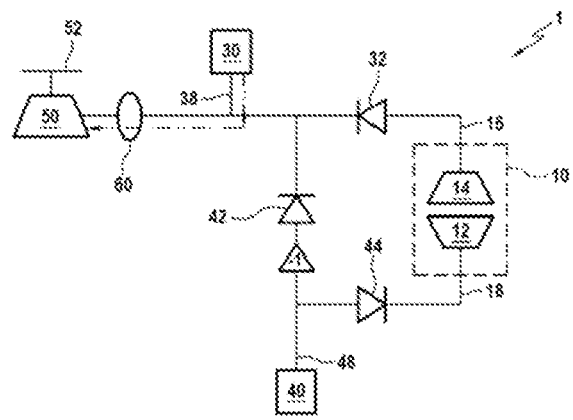
[Fig. 8B]
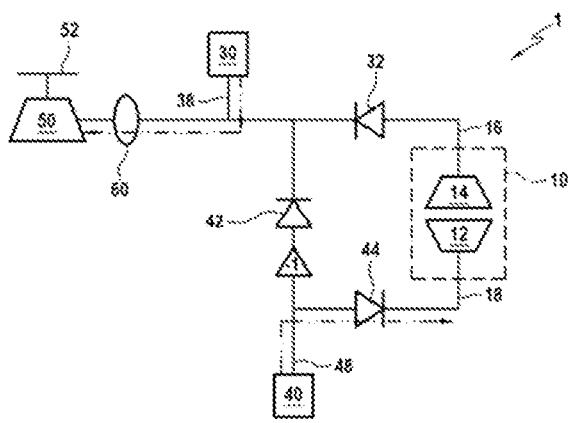
[Fig. 8C]
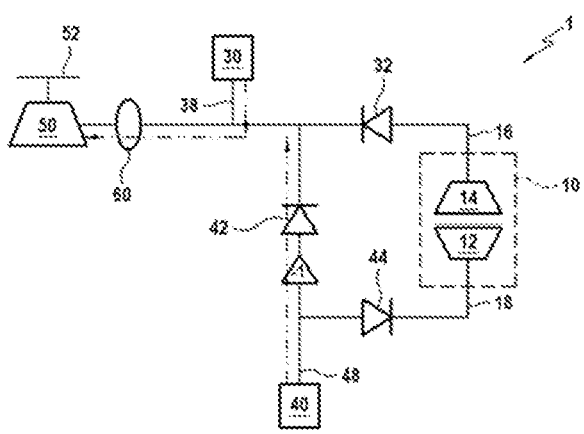

[Fig. 9]
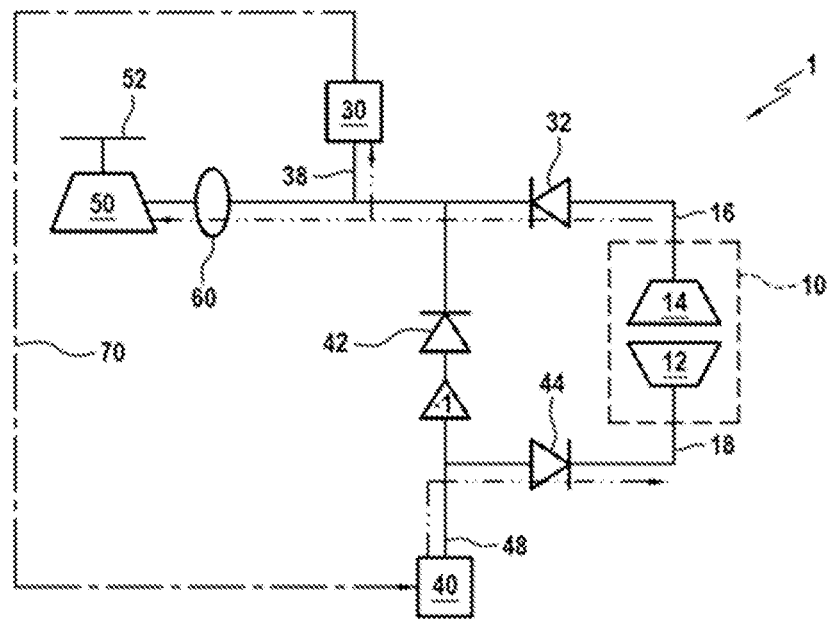
[Fig. 10]
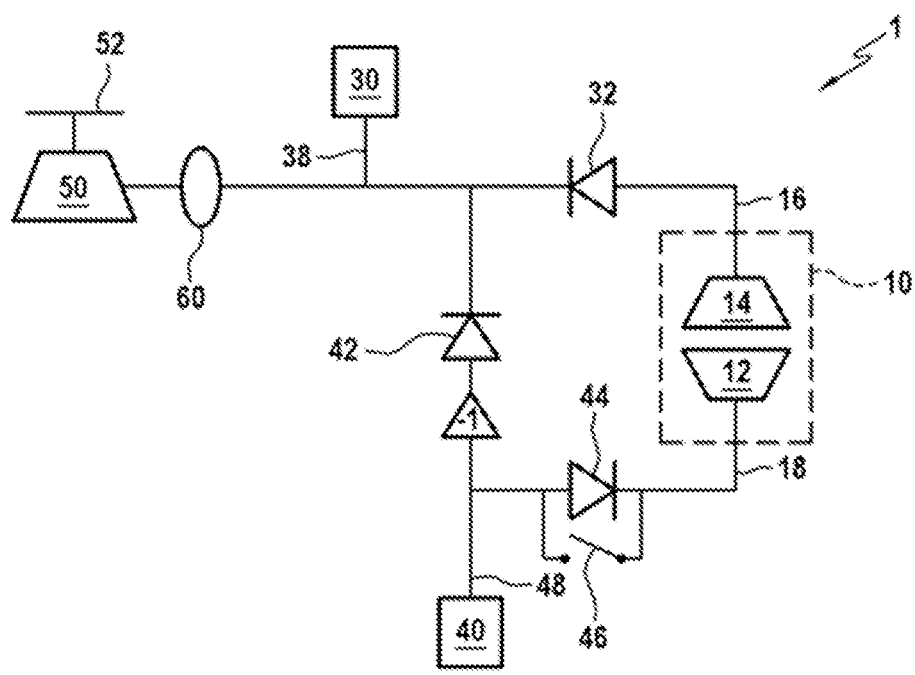

[Fig. 11]
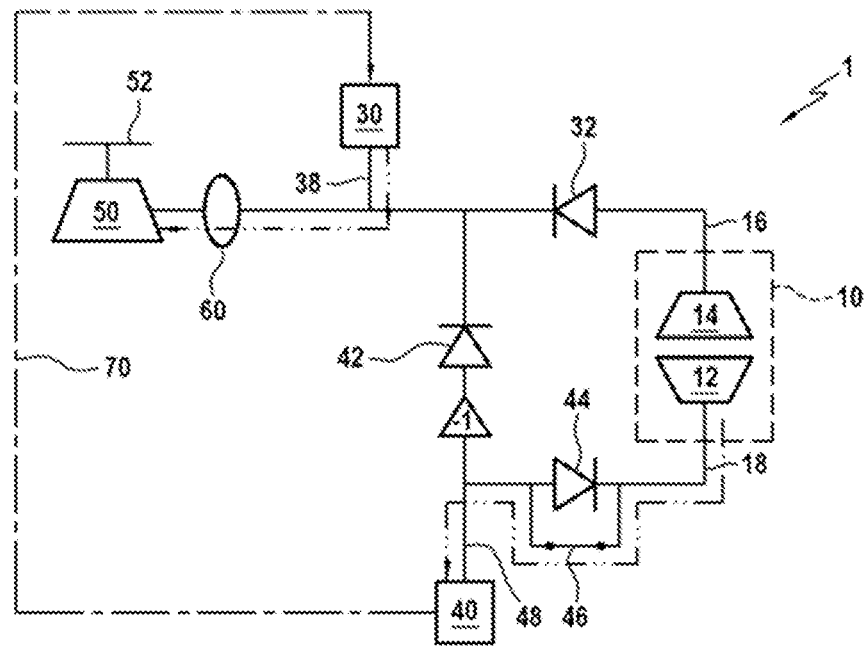
[Fig. 12]
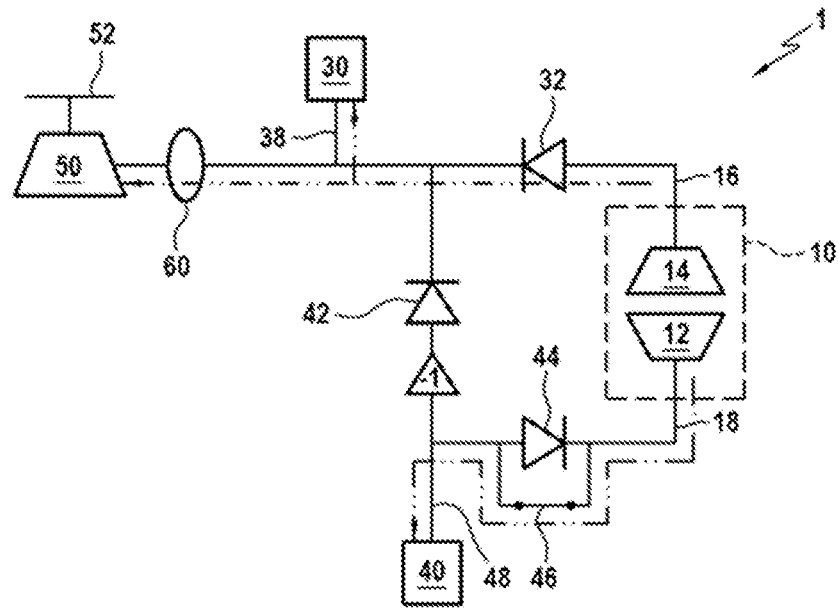

[Fig. 13]
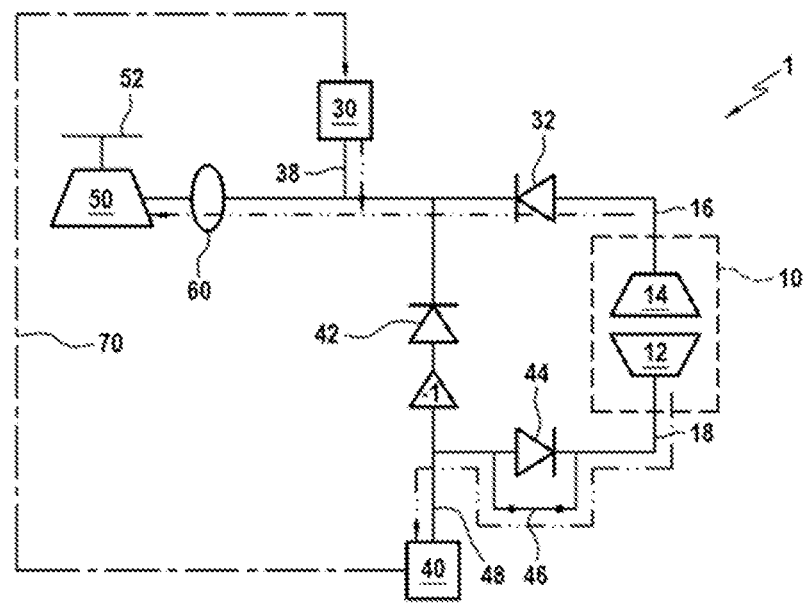
[Fig. 14]
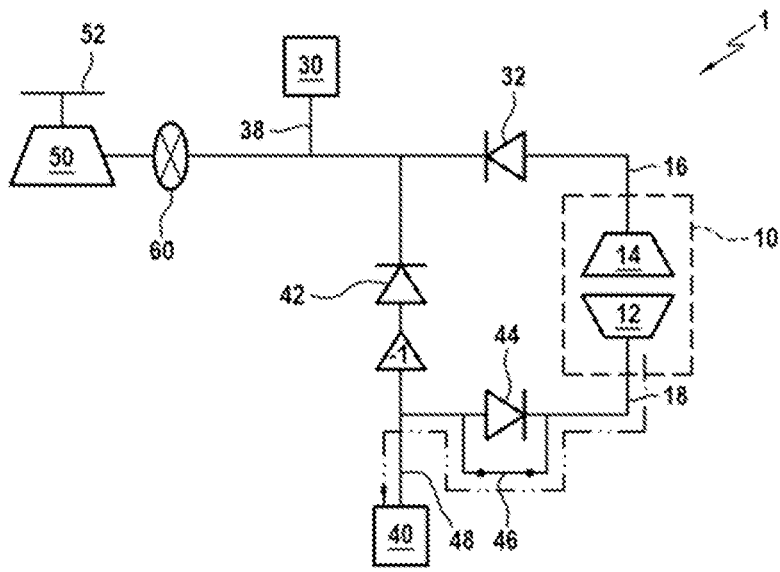

[Fig. 15]
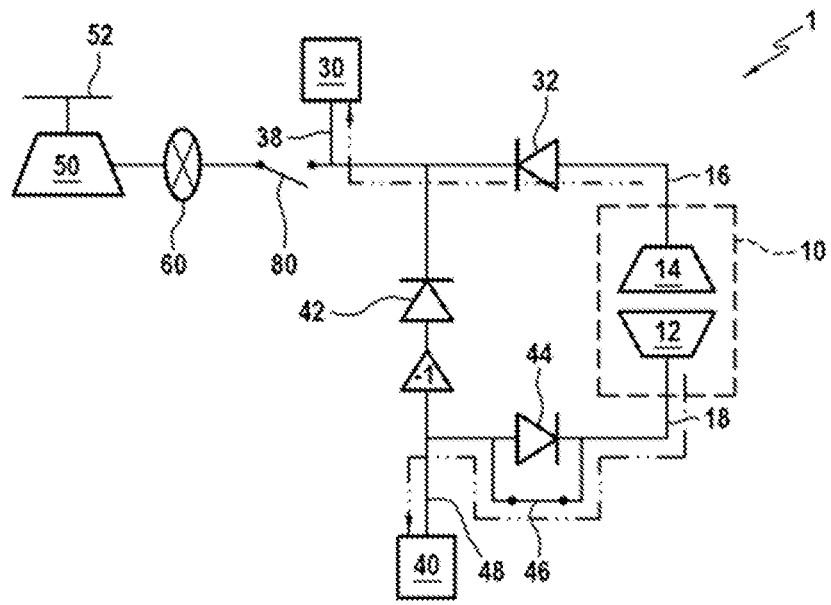
[Fig. 16]
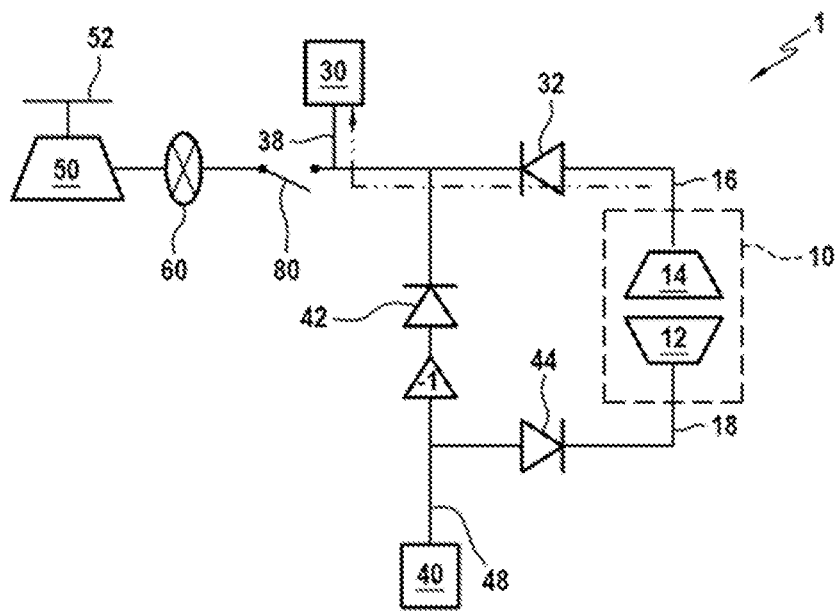

[Fig. 17]
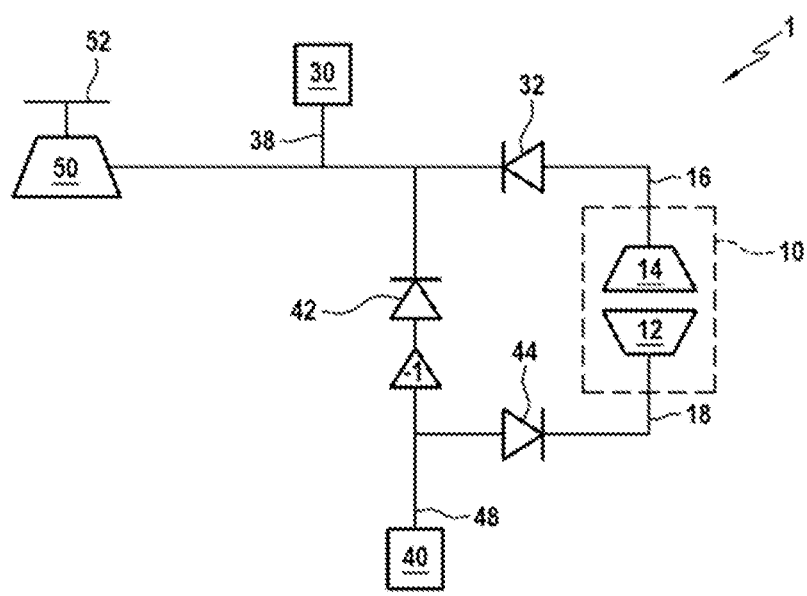

TRANSMISSION DEVICE FOR HYBRID AIRCRAFT

CROSS-REFERENCE TO RELATED APPLICATIONS

This is a National Stage Application under 35 U.S.C. § 371 of International Application No. PCT/FR2022/050779, filed Apr. 25, 2022, now published as WO 2022/234210 A1 which claims priority to French Patent Application No. 2104791, filed on May 6, 2021.

TECHNICAL FIELD

This invention relates to the field of hybrid aircraft, comprising at least one turbomachine such as a turboshaft engine or a turboprop engine, for flying machines such as helicopters or aircraft. In particular, the invention relates to a transmission device for hybrid aircraft, and a hybrid aircraft comprising such a transmission device.

PRIOR ART

In a known manner, a turbomachine, for example a turboshaft engine, particularly for a helicopter, includes a gas turbine having a gas generator and a free turbine rotationally driven by the stream of gas generated by the gas generator. Furthermore, a hybrid aircraft generally comprises, in addition to this turbomachine, a reversible electric machine coupled to the gas generator, in such a way as to set the gas generator in rotation during a start-up phase of the turbomachine, or in flight in such a way as to ensure the non-propulsive electrical requirements of the aircraft.

Conventionally, the gas generator includes at least a compressor and a turbine rotationally coupled. The operating principle is as follows: the cool air entering the gas turbine is compressed due to the rotation of the compressor before being sent to a combustion chamber where it is mixed with a fuel. The gas burned due to combustion is then expelled at high speed. A first expansion then occurs in the turbine of the gas generator, during which the latter extracts the energy needed to drive the compressor. The turbine of the gas generator does not absorb all the kinetic energy of the burned gas and the excess of kinetic energy corresponds to the stream of gas generated by the gas generator. The latter thus supplies kinetic energy to the free turbine such that a second expansion occurs in the free turbine which converts this kinetic energy into mechanical energy to drive a receiving member, such as the rotor of the helicopter.

During the start-up phase of the turbomachine, it is necessary to rotationally drive the gas generator, i.e. to rotationally drive the compressor coupled to the turbine. As mentioned above, this is precisely one of the roles of the reversible electrical machine, also known, which is usually an electric motor able to operate reversibly as an electric generator.

The rotational driving of the compressor by the reversible electric machine operating as a motor specifically makes it possible to circulate the air in the compressor and therefore to convey compressed air into the combustion chamber to initiate the combustion. This combustion then produces the stream of gas making it possible to rotationally drive the turbine, after which the compressor is directly rotationally driven by the turbine, which means that the gas generator operates independently, indicating the end of the start-up phase of the turbomachine. It is known that aircraft, into which such turbomachines are particularly intended to be integrated, include electrical apparatuses that need to be supplied with electrical energy. For example, for a helicopter it is necessary to supply electrical energy to the electrical apparatuses with which it is equipped, such as for example the electric controls, the heating, the air conditioning, and the hoist.

Until now, in flight, the reversible electric machine was used to supply electricity to the electrical apparatuses. To do this, the electric machine, this time operating as an electrical generator, was rotationally driven by the gas generator, the rotational kinetic energy drawn off the gas generator being converted into electrical energy by said machine. For a helicopter, however, the drawing of energy off the gas generator has drawbacks. The variation, during flight, of the mechanical power drawn by the electric machine off the gas generator manifests as a movement of the operating line of the engine in the compressor map. This movement corresponds to a surge margin for which it is necessary to make provision, which has the consequence of penalizing the optimization of the operating line of the engine, by prohibiting the use of the compressor at an optimal pressure ratio, and hence degrading the stabilized performance, with an impact on specific fuel consumption.

The document FR2929324 met this problem by allowing the same electrical machine to start the engine by driving the gas generator, then to operate as an electrical generator by drawing power off the free turbine. This solution in particular makes it possible to avoid drawing power off the gas generator and thus improve the specific consumption of the gas turbine. However, this architecture does not allow for the injection of mechanical power to the main rotor of the helicopter for autorotation assistance for example.

The improvement of the power density and reliability of the equipment of the electrical system (storage, conversion, electric machines) now makes it possible to envision making the main rotor hybrid, i.e. possessing at least one electric machine connected to the main rotor and able to input power to it. This power, which supplements the power of the turbine, in particular allows a power contribution for transient phases (resources, takeoff etc.), a power contribution to relieve the gas turbine and optimize its lifetime, and also 100% electrical operation in the event of loss of the gas turbine, for a limited period of time. In addition, it is possible to use this electric machine to generate electricity (for normal power consumption and/or recharge batteries).

To fulfil these functions, the electric machine or electric machines must be dimensioned at a power far exceeding that of the generators/starters usually used, typically one or more hundreds of kilowatts, instead of ten or so kilowatts. It is therefore desirable to pool the two types of electric machine (the generator/starter of the turbine and the electric machine connected to the rotor).

The use of such electric machines is known, particularly with several hybrid architectures, making it possible to fulfil various functions such as the starting of the gas generator, the generation of electricity on the ground, or the supply of electrical power to the main rotor.

However, the proposed architectures do not allow for the fulfilment of certain functions by the electric machines. In particular, these architectures only allow the electric machine to input power to the gas generator during starting. Neither it is possible to continuously draw power off the rotor of the helicopter with an electric machine and to continuously reinject this power into the gas generator with another electric machine. More precisely, the in-flight assistance for the gas generator is only possible by the activation of at least one lockable free wheel or clutch with each use.

However, such a lockable free wheel or clutch system is liable to be used frequently, and is associated with a high degree of criticality. In other words, given the frequent use of the functions with which these clutchable parts are associated, the malfunction risks are considerable, limiting the reliability of the device. In addition, such architectures do not ensure an optimal level of redundancy, and also involve a large number of components and connections.

The document FR3066444 discloses other examples of hybrid architectures used to make power transfers between rotors of a turbomachine.

However, the architectures proposed in this document do not make it possible to address certain types of functionality specific to helicopter applications in which the main rotor and the free turbine can be desynchronized. By way of example, and without limitation, autorotation assistance via electric machines injecting power into the transmission, or the generation of electricity to power the onboard systems, downstream of the engine free wheel, are not allowed, particularly following a failure of the turbomachine.

Finally, the architectures described in this document require two reversible electric machines in the engine perimeter, and capable of turning in both directions of rotation using four declutchable coupling systems. This high degree of integration into the engine perimeter, as well as the number of couplings needed, is a barrier to use on helicopters due to the presence of many common fault modes.

A need therefore exists for a transmission device with an architecture meeting the aforementioned drawbacks, at least in part.

SUMMARY OF THE INVENTION

This present disclosure relates to a transmission device for a hybrid aircraft, particularly a helicopter, the aircraft comprising at least one turbomachine including at least one gas generator, a free turbine rotationally driven by a stream of gas generated by the gas generator, and a main rotor, the transmission device comprising a first reversible electric machine able to be coupled to a shaft of the free turbine by way of a first deactivatable coupling means, and to the main rotor, and a second reversible electric machine able to be coupled to a shaft of the gas generator by way of a second deactivatable coupling means, and to be coupled to the main rotor by way of a third deactivatable coupling means, the second deactivatable coupling means being configured to be activated when the second electric machine rotates in a first direction of rotation, and the third deactivatable coupling means being configured to be activated when the second electric machine rotates in a second direction of rotation opposite to the first direction of rotation.

The term "deactivatable coupling means" should be understood to mean that the coupling means can be in an activated position in which the members connected to said coupling means are coupled, or in a deactivated position in which said members are uncoupled, it being understood that the term "member" should be understood to mean the electric machines, the main rotor, the gas generator and the free turbine.

The driving device according to this disclosure is particularly advantageous in that the two electric machines are specialized in order to fulfil complementary functions, while together providing the level of redundancy necessary for the critical functions to increase flight safety. More precisely, the first electric machine can provide the draw off the free turbine or the main rotor, so as not to affect the performance of the gas generator, or the injection of power to the main rotor so as to assist the latter in certain operating phases. Furthermore, the second electric machine can be used in one direction of rotation to be mechanically coupled to the gas generator, and in the other direction of rotation to be mechanically coupled to the main rotor. In particular, the second electric machine rotating in the first direction of rotation allows the coupling with the gas generator to start the latter on the ground, but also the coupling with the gas generator to top up the thermodynamic power in certain flight phases, for assistance in transient phases or for the modification of the engine operating point for example.

Furthermore, the second electric machine rotating in the first direction of rotation can be used to restart the gas generator in flight, for example following a fault therein, without requiring the activation of another mechanical member such as a clutch. In addition, even when the second electric machine is used in the first direction of rotation to restart the electrical generator in flight, the first electric machine can be used in parallel to drive the main rotor.

Moreover, the second electric machine rotating in the second direction of rotation makes it possible to drive the main rotor as a replacement for the first electric machine in the event of a fault in the latter, or complementing it in certain flight phases requiring an additional power contribution.

Consequently, the architecture according to this disclosure has the advantage of being simple by limiting the number of components and connections, while ensuring a good level of redundancy and making it possible to fulfil a high number of functions, and thus improve the reliability of the device. Additionally, according to the invention, the second reversible electric machine makes it possible both to start or assist the gas generator or the main rotor. In a particular embodiment, a single active system also makes it possible to supply electricity by drawing off the gas generator to recharge the batteries on the ground, or in the event of a malfunction of the first electric machine for example.

In certain embodiments, the first, second and third deactivatable coupling means comprise a free wheel.

One benefit of the free wheel is that it does not need to be electronically or mechanically controlled by an outside operator. The free wheel moreover has a high degree of reliability. Such a free wheel is generally composed of a hub and a peripheral crown mounted rotatably on the hub. The hub can generally rotationally drive the peripheral crown but not the other way around. It should be noted that in certain cases, the free wheel is disposed such that the peripheral crown can rotationally drive the hub, but not the other way around, without compromising the principle of this invention. Also, the hub can only drive the crown when the hub turns in a predetermined direction with respect to the crown, which will be known as the "direction of engagement". In the contrary case, the hub and the peripheral crown rotate freely with respect to one another. In this case, the deactivatable coupling means are activated when the hub of the free wheel rotationally drives the peripheral crown, and, conversely, the deactivatable coupling means are deactivated when the hub of the free wheel does not rotationally drive the peripheral crown. The fact of using free wheels as coupling elements between the different members, in the absence of other coupling means such as clutches or dogs, improves the reliability of the transmission device.

In certain embodiments, the first electrical machine is configured to operate in generator mode, in which it is rotationally driven by transmission members and the main rotor, which can themselves be driven by the free turbine by way of the first coupling means, in such a way as to generate electrical energy, or in motor mode in which it inputs power to the main rotor.

The first electric machine may thus generate electrical energy without drawing power off the gas generator, which makes it possible to improve the specific consumption of the gas turbine. In addition, the transmission device of this present disclosure allows a simultaneous contribution of electrical power to the main rotor by the first electric machine, and to the gas generator by the second electric machine.

In certain embodiments, the device comprises a rotor brake able to be disposed between the free turbine and the main rotor by being movable between a braking position preventing the driving of the main rotor by the free turbine, and a free position allowing the driving of the main rotor by the free turbine.

More precisely, the first electric machine and the free turbine are coupled to the main rotor, while a movable rotor brake disposed on the kinematic chain allows it to be locked. During start-up, the hot gas drives the free turbine. The latter, connected to the main rotor by way of the first coupling means, can be either free when the rotor brake is in the free position, or locked by the rotor brake when the latter is in the locking position. This locking position thus makes it possible to lock the free turbine, and therefore the main rotor, particularly if starting up in high winds.

In certain embodiments, the first electric machine is configured to rotate in a direction opposite to the direction of rotation of the main rotor, in such a way as to brake the driving of the main rotor by the free turbine. In other words, the first electric machine is configured to generate a resistive torque, making it possible to counter the torque of the free turbine driving the main rotor. The first electric machine can thus fulfil the functions of the rotor brake described in the preceding paragraph, without requiring the use of the latter. This alternative is advantageous insofar as a rotor brake, which is an expensive part, must be regularly checked and changed. It also presents a risk of non-deliberate activation in flight. This alternative therefore makes it possible to limit costs and improve the reliability of the device.

In certain embodiments, the device comprises a dog clutch, or a clutch disposed between the rotor brake and the free turbine, the dog clutch being movable between a coupling position in which the shaft of the free turbine is coupled with the main rotor, and an uncoupling position in which the shaft of the free turbine and the main rotor are uncoupled, the first electric machine being coupled to the free turbine upstream of the dog clutch, in such a way that the free turbine can input electrical power to the first electric machine even when the dog clutch is in the uncoupling position.

The term "upstream" refers to the direction of circulation of the mechanical energy toward the main rotor, in other words, in the "free turbine—main rotor" direction. In certain operational phases, it is necessary to be able to generate the electrical power while keeping the rotor locked. The transition of the dog clutch into the uncoupling position thus allows the use of the rotor brake, while keeping the free turbine ignited to generate electrical power to the first electric machine, without damaging the free turbine.

In certain embodiments, the first electric machine is electrically connected to the second electric machine, in such a way that the device is able to transfer electrical power from the main rotor to the gas generator by way of the first electric machine and of the second electric machine rotating in the first direction of rotation.

In certain flight phases, it may be desirable to transfer power from the main rotor to the gas generator. In this case, the first electric machine connected to the main rotor and to the free turbine draws power, transmitted in the form of electrical current to the second electrical machine which delivers it to the gas generator via the second coupling means, by rotating in the first direction of rotation. The fact of exchanging electrical power between the gas generator and the main rotor makes it possible to modify the operating point of the turbine to increase the net power through the main rotor for the same gas turbine lifetime or increase the lifetime of the gas turbine for the same power through the main rotor of the helicopter.

In certain embodiments, the second coupling means comprises a locking means movable between a free position in which the gas generator cannot rotationally drive the second electric machine, and a locked position in which the gas generator is able to rotationally drive the second electric machine, in such a way that the second electric machine draws electrical power off the gas generator.

In certain embodiments, the device is configured such that the electrical power drawn off the gas generator by the second electric machine is transferred to the first electric machine.

The locking means is a means making it possible to force the coupling between the second electric machine and the gas generator. For example, when the coupling means comprises a free wheel and a locking means, the free wheel is the so-called "lockable free wheel", such that in the locked position, the hub of the free wheel can rotationally drive the peripheral crown of the lockable free wheel. In other words, the gas generator is able to rotationally drive the second electric machine. In other words, the second electric machine can be used to draw power off the GG and thus supply electrical power to the on-board network in APU (Auxiliary Power Unit) mode on the ground for the recharging of batteries for example. This also makes it possible to slow down the speed of rotation of the gas generator more quickly when this proves necessary, for example in the event of a shutdown of the gas turbine. Moreover, the electrical power thus generated on the second electric machine can be used by the first electric machine, via an electrical connection between the first electric machine and the second electric machine.

In certain embodiments, the device comprises a control unit configured to control the first electric machine, the second electric machine, the locking means, the rotor brake and the dog clutch.

This present disclosure also relates to a hybrid aircraft, particularly of a helicopter, comprising a turbomachine having at least one gas generator, a free turbine rotationally driven by a stream of gas generated by the gas generator, a main rotor, and comprising a transmission device as claimed in any of the preceding embodiments. The term "hybrid aircraft" should be understood to mean an aircraft comprising a thermal engine making it possible to rotationally drive a main rotor, and at least one electric machine making it possible to input power to the thermal engine.

In certain embodiments, the hybrid aircraft is a helicopter.

BRIEF DESCRIPTION OF THE DRAWINGS

The invention and its advantages will be better understood on reading the detailed description given hereinafter of different embodiments of the invention given by way of non-limiting example. This description refers to the appended pages of figures, wherein:

FIG. 1 represents a section view of a turbomachine according to the invention,

FIG. 2 schematically represents a first embodiment of a transmission device of the invention, FIGS. 3A and 3B represent the transmission device of FIG. 2, according to two examples of a first operation, FIG. 4 represents the transmission device of FIG. 2, according to a second operating mode, FIG. 5 represents the transmission device of FIG. 2, according to a third operating mode, FIG. 6 represents the transmission device of FIG. 2, according to a fourth operating mode, FIG. 7 represents the transmission device of FIG. 2, according to a fifth operating mode, FIGS. 8A to 8C show the transmission device of FIG. 2, at different steps of a sixth operating mode, FIG. 9 represents the transmission device of FIG. 2, according to a seventh operating mode, FIG. 10 schematically represents a second embodiment of a transmission device of the invention, FIG. 11 represents the transmission device of FIG. 10, according to a first operating mode, FIG. 12 represents the transmission device of FIG. 10, according to a second operating mode, FIG. 13 represents the transmission device of FIG. 10, according to a third operating mode, FIG. 14 represents the transmission device of FIG. 10, according to a fourth operating mode, FIG. 15 schematically represents an example of a third embodiment of a transmission device of the invention, FIG. 16 schematically represents a fourth embodiment of a transmission device of the invention, FIG. 17 schematically represents an alternative embodiment of a transmission device of the invention.

DESCRIPTION OF THE EMBODIMENTS

A first embodiment of the invention, corresponding to a first architecture of the transmission device 1, will be described in the remainder of the description, with reference to FIGS. 1 to 9.

FIG. 1 schematically represents a turbomachine 100 in accordance with the present disclosure, particularly intended to rotationally drive transmission members 50 of a helicopter bearing a propeller or a main rotor 52. The turbomachine 100 comprises a gas turbine 10 having a gas generator 12 and a free turbine 14 able to be rotationally driven by a stream of gas generated by the gas generator 12. The free turbine 14 is mounted on a shaft 16 which transmits the rotational movement to a receiving member such as a main rotor 52 of the helicopter by way of the transmission members 50. According to this example, the gas turbine 10 represented in FIG. 1 is of the type with a front power take-off with return by coaxial shaft. One could very well consider, without departing from the scope of this invention, a gas turbine with a free turbine of the type with a front power take-off with return by inner or outer shaft, or else a turbomachine with a free turbine of the type with a rear power take-off.

The gas generator 12 includes a rotary shaft 18 on which are mounted a compressor 20 and a turbine 22, as well as a combustion chamber 24 axially disposed between the compressor 20 and the turbine as soon as one considers the gas generator 12 along the axial direction of the rotary shaft 18. The gas turbine 10 has a casing 26 equipped with an air intake 28 via which cool air enters into the gas generator 12. After it is taken into the chamber of the gas generator 12, the cool air is compressed by the compressor 20 which discharges it back toward the inlet of the combustion chamber 24 in which it is mixed with fuel. The combustion that takes place in the combustion chamber 24 causes the high-speed expulsion of the burned gas toward the turbine 22, which has the effect of rotationally driving the shaft 18 of the gas generator 12 and, consequently, the compressor 20. The speed of rotation of the shaft 18 of the gas generator 12 is determined by the flow rate of fuel entering into the combustion chamber 24.

Despite the extraction of kinetic energy by the turbine 22, the stream of gas exiting the gas generator has significant kinetic energy. As will be understood using FIG. 1, the stream of gas F is directed to the free turbine 14 which has the effect of causing an expansion in the free turbine 14 leading to the rotation of the turbine wheel and of the shaft 16.

A transmission device 1 includes a first reversible electric machine 30 consisting in this case of an electric motor able to operate reversibly as an electrical generator. Note that although the first reversible electric machine 30 can be disposed within the turbomachine perimeter, this disposition is not limiting. The reversible electric machine 30 can specifically be disposed in perimeters of the helicopter separate from the turbomachine 100, without departing from the scope of the invention. This remark applies in general to the whole of the transmission device also comprising the second electric machine and the different coupling means described in the remainder of the description. The first reversible electric machine 30 is mechanically coupled to the shaft 16 of the free turbine 14 by way of a first deactivatable coupling means 32.

Preferably, the first deactivatable coupling means 32 comprises a free wheel mounted such that the rotation of the shaft 16 can rotationally drive the main rotor 52 and a shaft 38 of the first electric machine 30 when this operates in generator mode in order to supply electricity, but such that, contrariwise, the rotation of the shaft 38 of the first electric machine 30 cannot rotationally drive the shaft 16 of the free turbine 14. In other words, the free wheel of the first coupling means 32 can only transfer a rotational torque in the direction of the free turbine 14 toward the main rotor 52 and the first electric machine 30, but not the other way around. On a helicopter, this free wheel is commonly known as the "engine free wheel". Note that the use of a free wheel for deactivatable coupling means is not limiting, the free wheel being able to be replaced by any dog or clutch system.

The first electric machine 30 is also able to be coupled to the main rotor 52 in such a way that the first electric machine 30, operating in electric motor mode, is able to rotationally drive the main rotor 52. As indicated above, the first electric machine 30 in electric motor mode can rotationally drive the main rotor 52, but not the free turbine 14, given the presence of the free wheel of the first coupling means 32.

The device preferably comprises a rotor brake 60 disposed between the first electric machine 30 and the main rotor 52. The rotor brake 60 is movable between a braking position (represented by a cross on FIG. 3B for example), preventing the rotation of the main rotor 52 and of the free turbine 14, and a free position allowing the rotation of the main rotor 52 and of the free turbine 14. Note, however, that although FIGS. 1 to 16 represent a device comprising such a rotor brake 60, it is also possible to dispense with the use thereof, without departing from the scope of the invention. Specifically, the rotor brake function can also be fulfilled by the first electric machine 30 which, by being controlled in such a way as to create a torque opposing the rotation of the main rotor 52, makes it possible to brake, or even lock the latter. Such an alternative embodiment is represented in FIG. 17, and is applicable to all the embodiments described in the remainder of the disclosure.

The transmission device according to the present disclosure further comprises a second reversible electric machine 40, similar to the first reversible electric machine 30. The second reversible electric machine 40 is mechanically connected to the shaft 18 of the gas generator 12 by way of a second deactivatable coupling means 44.

Preferably, the second deactivatable coupling means 44 comprises a free wheel mounted such that the rotation of a shaft 48 of the second reversible electric machine 40 can rotationally drive the shaft 18 of the gas generator 12 when the second electric machine is operating in electric motor mode (second coupling means 44 activated), but such that contrariwise, the rotation of the shaft 18 of the gas generator 12 cannot rotationally drive the shaft 48 of the second reversible electric machine 40. In other words, the free wheel of the second coupling means 44 can only transfer a rotational torque in the direction of the second electric machine 40 toward the gas generator 12, but not the other way around.

The second electric machine 40 is also able to be coupled to the main rotor 52, by way of a third reversible coupling means 42 similar to the first and second coupling means and preferably comprising a free wheel, in such a way that the second electric machine 40, operating in electric motor mode (third coupling means 42 activated), is able to rotationally drive the main rotor 52.

In accordance with the transmission device 1 of the present disclosure, the second electric machine 40 is able to rotate in a first direction of rotation in which it is mechanically coupled to the shaft 18 of the gas generator 12, and in a second direction of rotation, opposite to the first direction of rotation, in which it is mechanically coupled to the main rotor 52. By convention, in the remainder of the description the term "a positive direction" should be understood to mean a direction of rotation of the second electric machine 40 in which the second coupling means 44 is activated, and "a negative direction" should be understood to mean a direction of rotation of the second electric machine 40 in which the third coupling means 42 is activated. In particular, the element represented by "−1" in FIG. 2 and the following figures represent gears, for example pinions, allowing the reversal of the direction of rotation. It will thus be understood that when the second electric machine 40 rotates in the positive direction, the second coupling means 44 can be activated, and the third coupling means 42 is deactivated, and when the second electric machine 40 rotates in the negative direction, the second coupling means 44 is deactivated, and the third coupling means 42 can be activated.

Given this first architecture, different functions can be fulfilled by the transmission device. These different functions are described below with reference to FIGS. 3A to 9. In these figures, the arrows in broken lines represent a direction of transmission of mechanical or electrical power between two elements. In FIG. 3A for example, mechanical power is transmitted from the second electric machine 40 to the gas generator 12, and from the free turbine 14 to the main rotor 52. It can also be noted that, in general, for the sake of clarity, FIGS. 3A to 16 represent, schematically and in a functional and simplified way, the different modes of operation of the device, without representing all the details of the constituent elements of the turbomachine and the different power transmission members. In particular, the pinions and any gear ratios are not represented.

FIGS. 3A and 3B represent an operating mode for starting the gas turbine 10. The second electric machine 40 is controlled, for example by a control unit (not shown), in such a way as to rotate in the positive direction. Thus, it drives the gas generator 12 by way of the free wheel of the second coupling means 44, allowing the starting of the gas generator 12. At start-up, the hot gas drives the free turbine 14. The latter, connected to the main rotor 52 via the free wheel of the first coupling means 32, can be either free, when the rotor brake 60 is in the free position (FIG. 3A), or locked by the rotor brake when the latter is in the braking position, (FIG. 3B). The latter configuration, illustrated in FIG. 3B, may be useful if starting up in high winds. Moreover, since the power of the second electric machine 40 is in the order of one or more hundreds of kilowatts, it is possible to start the turbine much more quickly than with a starter of a power in the order of 10 kW, usually used. In particular, this offers an operational advantage for missions of medical aid type, or during attempted quick restarts in flight.

FIG. 4 shows a nominal operation, i.e. in flight and in the absence of any fault, allowing the first electric machine 30 to operate in electrical generator mode. In this configuration, the gas generator 12 operates independently and is no longer driven by the second electric machine 40. Moreover, the free turbine 14 drives the main rotor 52 and the first electric machine 30 by way of the free wheel of the first coupling means 32. The electrical power generated by the first electric machine 30 can be used to power the on-board electric accessories or charge the battery.

FIG. 5 represents a nominal operation allowing a contribution of power to the main rotor 52 by the first electric machine 30 and the second electric machine 40, each operating in electric motor mode. The second electric machine 40 then rotates in the negative direction. This configuration can be useful in certain flight phases requiring an additional power contribution, for example at takeoff. The first electric machine 30 and the second electric machine 40 thus top up the power input to the main rotor 52 by the free turbine 14.

FIG. 6 represents a nominal operation allowing the first electric machine 30 to operate in electrical generator mode as in the configuration illustrated in FIG. 4, and allowing for a parallel power contribution to the gas generator 12 by the second electric machine 40. The second electric machine 40 then rotates in the positive direction. This configuration can be useful in certain flight phases, for example to assist the gas generator during rapid accelerations, or to modify the engine operating point under "high altitude—hot weather" in-flight operating conditions.

FIG. 7 represents a nominal operation allowing a contribution of power both to the main rotor 52 by the first electric machine 30, and to the gas generator 12 by the second electric machine 40, each operating in electric motor mode. The second electric machine 40 then rotates in the positive direction. This in particular allows for a different strategy from FIG. 6 for assistance in the rapid transients, in which the electric machine 30 assists the rotor 52 to limit RPM drop, while the electric machine 40 assists the gas generator 12 to improve the availability time of the power to the free turbine 14.

FIGS. 8A to 8C show an operating mode allowing the restarting of the gas turbine 10 in flight, in the event of it shutting down. The shutdown of the gas turbine 10 leads to a desynchronization of the free turbine 14 from the main rotor 52 via the free wheel of the first coupling means 32. Immediately after the detection of the turbomachine shutdown, the first electric machine 30 operates in electric motor mode to supply emergency power to the main rotor 52 (FIG. 8A). The speed of the gas generator 12 then decreases to an ignition window, allowing the restarting of the turbomachine. During this time, the second electric machine 40 may advantageously be set to rotate in the positive direction at a speed slightly lower than the re-ignition speed. This makes it possible to save time and facilitate the resynchronization of the free wheel of the second coupling means 44.

When the ignition window is reached, the second electric machine 40 rotating in the positive direction then drives the gas generator 12 by way of the free wheel of the second coupling means 44, making it possible to restart the gas turbine 10 (FIG. 8B).

Once the gas turbine 10 has started, the electric machine 40 can contribute to the rapid run-up of the gas turbine to reduce the availability time of the engine power. From another perspective, when the gas turbine 10 is independent and while awaiting the resynchronization of the free wheel of the first coupling means 32, the second electric machine 40 can otherwise be used to drive the main rotor 52, by rotating in the negative direction, by way of the third coupling means 42, and thus complete the power contribution of the first electric machine 30 (FIG. 8C) to limit the loss of speed of the rotor 52. The free turbine 14 accelerates and thus resynchronizes itself with the main rotor 52, allowing a return to the nominal situation. Once the nominal situation has been regained, the first and second electric machines 30, 40 can stop the contribution of power to the main rotor 52.

This architecture is particularly advantageous in that it makes it possible, with only two electric machines, to supply both power to the main rotor 52, by the first electric machine 30 and the second electric machine 40, while permitting the restarting of the gas turbine 10 by the second electric machine 40 in certain operating phases. It will moreover be noted that the different steps described above can be performed by the control unit (not shown), making it possible to detect the shutdown of the engine, the speed of rotation of the shafts of the gas generator and of the free turbine, and to control the electric machines.

Furthermore, if restarting in flight is impossible, is not operational, or is not desired, for example in the event of a fire in the gas turbine 10 or the loss of a bearing, the two electric machines 30 and 40 (rotating in the negative direction) may supply a power contribution to the main rotor 52 to help it auto-rotate, or to allow a level pull-out flight before landing. This flight phase is operationally equivalent to the configuration illustrated in FIG. 8C. In this configuration, the main rotor 52 benefits from the entirety of the available electrical power, provided by the first and second electric machines 30, 40. In addition, in the event of a failure of one of the electric machines, the remaining electric machine has the capability to provide half of the installed electrical power.

FIG. 9 shows a nominal operation allowing the first electric machine 30 to operate in electrical generator mode and in parallel allowing a contribution of power to the gas generator 12 by the second electric machine 40, as in the configuration illustrated in FIG. 6. Furthermore, the first electric machine 30 is electrically connected to the second electric machine 40 by way of an electrical connection 70. The electrical connection 70 may include power shaping devices (rectification, inverters, voltage conversion). This connection allows the first electric machine 30, connected to the main rotor 52 and to the free turbine 14, to draw electrical power, and to transmit it in the form of electric current by way of the electrical connection 70 toward the second electric machine 40, which then delivers it to the gas generator 12, by way of the second coupling means 44 rotating in the positive direction. It is thus possible to transfer electrical power from the main rotor 52 to the gas generator 12, in certain flight phases requiring such a transfer.

A second embodiment of the invention, corresponding to a second architecture of the transmission device, will be described in the remainder of the description, with reference to FIGS. 10 to 14.

According to this second architecture, the second deactivatable coupling means 44 also comprises a locking means 46. The locking means 46 is movable between a free position in which the gas generator 12 cannot rotationally drive the second electric machine 40, and a locked position making it possible to lock the free wheel of the second deactivatable coupling means 44 and thus to force the coupling between the gas generator 12 and the second electric machine 40. In other words, when the locking means 46 is in the locking position, the second coupling means 44 acts as a shaft such that the gas generator 12 is able to rotationally drive the second electric machine 40, despite the presence of the free wheel of the second deactivatable coupling means 44. It will be noted that the position change of the locking means 46 can be done by an electric, pneumatic or hydraulic component and controlled by a user or a control unit.

Apart from the presence of this locking means 46, the transmission according to the second embodiment is identical to the transmission device according to the first embodiment described above. Consequently, when the locking means 46 is in the free position schematically represented in FIG. 10, the functions performed by this second architecture are the same as the functions described above, with reference to the first architecture. FIGS. 11 to 14 have functions which can be embodied by this second architecture, when the locking means 46 is in the locking position.

FIG. 11 has an operation making it possible to speed up the restarting of the gas turbine 10 in flight, if the latter shuts down. The operation of the device, in this scenario, is identical to that described above with reference FIGS. 8A to 8C. However, owing to the locking means 46 making it possible to lock the free wheel of the second coupling means 44, the second electric machine 40 can be used to draw power off the gas generator 12, and thus slow down the rotation speed of the gas generator 12 more quickly, to consequently reach the ignition window more quickly.

Moreover, the electrical power thus generated on the second electric machine 40 can be advantageously used by the first electric machine 30, by way of the electrical connection 70 between the first electric machine 30 and the second electric machine 40.

FIG. 12 has an operation allowing redundant power generation both on the first electric machine 30 and on the second electric machine 40. Specifically, it is sometimes desirable for the helicopter to have access to two redundant electrical power sources. This is possible using the second electric machine 40 as an ancillary generation source, by way of the lockable free wheel, more precisely of the locking means 46 in the locking position. The use of this function can for example be limited to the scenario of a failure of the electric machine 30. FIG. 13 has an operation allowing a transfer of electrical power from the gas generator 12 to the main rotor 52. In this case, the second electric machine 40 is connected to the gas generator 12 by way of the free wheel of the second coupling means 44, the free wheel being locked by the locking means 46. The second electric machine 40 thus draws power, transmitted in the form of electric current by way of the electrical connection 70 to the first electric machine 30 which delivers it to the main rotor 52. Note that before the locking of the free wheel of the second coupling means 44, it is preferable to synchronize the speeds on either side of said free wheel, by controlling the speed of the second electric machine 40 by way of the control unit for example, also knowing the speed of the gas generator 12 via the engine control system.

FIG. 14 has an operation making it possible to generate electricity on the ground. More precisely, this operating mode, the so-called APU (Auxiliary Power Unit) mode or function is an operating mode in which the gas turbine drives an electrical generator without driving the main rotor of the helicopter, to make it possible to ensure the supply of power to the electrical devices on the ground, such as batteries, flight equipment, heating or air conditioning. In particular, this mode can be used to recharge the batteries which can be used in flight to power the electric machines to provide the electrical assistance to the main rotor 52 from the take-off phase onward for example.

To fulfil this function, the locking means 46 is in the locking position so that the gas generator 12 can drive the second electric machine 40. The second electric machine 40 thus draws power to deliver it to the electrical equipment, while the free turbine 14 is locked by the rotor brake 60, then in the braking position.

A third embodiment of the invention, corresponding to a third architecture of the transmission device, will be described in the remainder of the description, with reference to FIG. 15.

The third architecture differs from the second architecture in that the transmission device further comprises a coupling system 80, for example a dog or a clutch. The coupling system 80 is movable between a coupling position in which the shaft 16 of the free turbine 14 is coupled with the main rotor 52, and an uncoupling position in which the shaft 16 of the free turbine 14 and the main rotor are uncoupled.

When the coupling system 80 is in the coupling position (not shown in FIG. 15), the functions fulfilled by the device according to this third architecture are the same as those described above with reference to the second architecture.

Furthermore, the terms "upstream" and "downstream" refer to the direction of circulation of the energy of the free turbine 14 toward the main rotor 52, in other words, in the "free turbine—main rotor" direction.

FIG. 15 illustrates a first example of the third architecture, having an operation making it possible to generate electricity on the ground (APU mode). To fulfil this function, the locking means 46 is in the locking position, and the dog clutch 80 is in the uncoupling position. The gas generator 12 thus drives the second electric machine 40 via the locked free wheel of the second coupling means 44. The second electric machine 40 consequently draws off power to deliver it to the electrical equipment, while the free turbine 14 can drive the first electric machine 30. Specifically, in this first example, the dog clutch 80 is disposed downstream of the coupling between the first electric machine 30 and the free turbine 14.

The presence of the dog clutch 80 in this position allows the use of the rotor brake 60, while allowing the driving of the first electric machine 30 by the free turbine 14 to generate electrical power. Specifically, in certain operational phases on the ground, it is necessary to be able to generate electrical power by keeping the main rotor 52 locked. However, on certain gas turbines, operating with the free turbine 14 locked can damage it. The uncoupling of the free turbine 14 from the main rotor 52 by the dog clutch 80 makes it possible to limit this drawback.

A fourth embodiment of the invention, corresponding to a fourth architecture of the transmission device, will be described in the remainder of the description, with reference to FIG. 16.

The fourth architecture is similar to the first architecture, but differs therefrom in that the transmission device further comprises a dog clutch 80, disposed downstream of the coupling between the first electric machine 30 and the free turbine 14. The dog clutch 80 of the fourth architecture can moreover be identical to the dog clutch 80 of the third architecture.

When the dog clutch 80 is in the coupling position, the functions fulfilled by the device according to the fourth architecture are identical to those fulfilled by the device according to the first architecture. Furthermore, according to this fourth architecture, when the dog clutch 80 is in the uncoupling position, in APU mode, power generation is only possible by the first electric machine 30.

Although this invention has been described with reference to specific exemplary embodiments, it is obvious that modifications and changes can be made to these examples without departing from the general scope of the invention as defined by the claims. In particular, individual features of the different embodiments illustrated/mentioned can be combined into additional embodiments. Consequently, the description and drawings must be considered in an illustrative sense rather than a restrictive one.

The invention claimed is:

1. A transmission device for a hybrid aircraft, the aircraft comprising a turbomachine including at least one gas generator, a free turbine rotationally driven by a stream of gas generated by the gas generator, and a main rotor, the transmission device comprising a first reversible electric machine able to be coupled to a shaft of the free turbine by way of a first deactivatable coupling means, and to the main rotor, and a second reversible electric machine able to be coupled to a shaft of the gas generator by way of a second deactivatable coupling means, and to be coupled to the main rotor by way of a third deactivatable coupling means, the second deactivatable coupling means being configured to be activated when the second electric machine rotates in a first direction of rotation, and the third deactivatable coupling means being configured to be activated when the second electric machine rotates in a second direction of rotation opposite to the first direction of rotation.

2. The device as claimed in claim 1, wherein the first, second and third deactivatable coupling means comprise a free wheel.

3. The device as claimed in claim 1, wherein the first electrical machine is configured to operate in generator mode, in which it is able to be rotationally driven by transmission members and the main rotor, themselves driven by the free turbine by way of the first coupling means, in such a way as to generate electrical energy, or in motor mode in which it is able to input power to the main rotor.

4. The device as claimed in claim 1, comprising a rotor brake able to be disposed between the free turbine and the main rotor by being movable between a braking position preventing the driving of the main rotor by the free turbine, and a free position allowing the driving of the main rotor by the free turbine.

5. The device as claimed in claim 4, comprising a dog clutch able to be disposed between the rotor brake and the free turbine, the dog clutch being movable between a coupling position in which the shaft of the free turbine is coupled with the main rotor, and an uncoupling position in which the shaft of the free turbine and the main rotor are uncoupled, the first electric machine being coupled to the free turbine upstream of the dog clutch, in such a way that the free turbine can input electrical power to the first electric machine even when the dog clutch is in the uncoupling position.

6. The device as claimed in claim 1, wherein the first electric machine is electrically connected to the second electric machine, in such a way that the device is able to transfer electrical power from the main rotor to the gas generator by way of the first electric machine and of the second electric machine rotating in the first direction of rotation.

7. The device as claimed in claim 1, wherein the second coupling means comprises a locking means movable between a free position in which the gas generator cannot rotationally drive the second electric machine, and a locked position in which the gas generator is able to rotationally drive the second electric machine, in such a way that the second electric machine is able to draw electrical power off the gas generator.

8. The device as claimed in claim 7, configured such that the electrical power drawn off the gas generator by the second electric machine is transferred to the first electric machine.

9. A hybrid aircraft comprising a turbomachine having the gas generator, the free turbine rotationally driven by a stream of gas generated by the gas generator, the main rotor, and comprising the transmission device as claimed in claim 1.

10. The hybrid aircraft as claimed in claim 9, the hybrid aircraft being a helicopter.

\* \* \* \* \*